(12) United States Patent
Maalioune et al.

(10) Patent No.: US 12,054,278 B2
(45) Date of Patent: Aug. 6, 2024

(54) HIGH AVAILABILITY ELECTRICAL SWITCHER: MONITORING OF A SIMPLEX ACTUATION CHAIN BY A REDUNDANT CONTROL

(71) Applicant: Safran Nacelles, Gonfreville l'Orcher (FR)

(72) Inventors: Hakim Maalioune, Moissy Cramayel (FR); Julien Corbin, Moissy Cramayel (FR); Alain Nourrisson, Moissy Cramayel (FR); Julien Calmels, Saint-Beauzely (FR); Maxime Pouyet, Vergongheon (FR)

(73) Assignee: Safran Nacelles, Gonfreville l'Orcher (FR)

( * ) Notice: Subject to any disclaimer, the term of this patent is extended or adjusted under 35 U.S.C. 154(b) by 693 days.

(21) Appl. No.: 17/188,809

(22) Filed: Mar. 1, 2021

(65) Prior Publication Data

US 2021/0206505 A1 Jul. 8, 2021

Related U.S. Application Data

(63) Continuation of application No. PCT/FR2019/051987, filed on Aug. 28, 2019.

(30) Foreign Application Priority Data

Aug. 30, 2018 (FR) ...................................... 18/57819

(51) Int. Cl.
*G05B 9/03* (2006.01)
*B64D 41/00* (2006.01)
*G05B 15/02* (2006.01)

(52) U.S. Cl.
CPC ............... *B64D 41/00* (2013.01); *G05B 9/03* (2013.01); *G05B 15/02* (2013.01)

(58) Field of Classification Search
CPC .......... B64D 41/00; G05B 9/03; G05B 15/02
See application file for complete search history.

(56) References Cited

U.S. PATENT DOCUMENTS

2013/0002179 A1* 1/2013 Ozaki ............... B60W 50/0225
 318/400.21
2019/0176993 A1* 6/2019 Skoglund ............... B64D 15/12

FOREIGN PATENT DOCUMENTS

| EP | 2419620 | 2/2012 |
|---|---|---|
| EP | 2878502 | 6/2015 |
| WO | 2010119204 | 10/2010 |

OTHER PUBLICATIONS

International Search Report for International Application PCT/FR2019/051987, mailed Nov. 15, 2019.

* cited by examiner

*Primary Examiner* — Gary Collins
(74) *Attorney, Agent, or Firm* — Burris Law, PLLC (57) ABSTRACT

An electrical control system intended for an aircraft turbojet engine nacelle includes two control modules of a single power module controlling an electric machine and an approval module linking each of the control modules to the single power module. The approval module selectively authorizes the control of the single power module by one of the control modules.

9 Claims, 4 Drawing Sheets

HIGH AVAILABILITY ELECTRICAL SWITCHER: MONITORING OF A SIMPLEX ACTUATION CHAIN BY A REDUNDANT CONTROL

CROSS-REFERENCE TO RELATED APPLICATIONS

This application is a continuation of International Application No. PCT/FR2019/051987, filed on Aug. 28, 2019, which claims priority to and the benefit of FR 18/57819 filed on Aug. 30, 2018. The disclosures of the above applications are incorporated herein by reference.

FIELD

The present disclosure relates to the electrical control systems equipping an aircraft, as well as a nacelle and/or an aircraft equipped with such a control system.

BACKGROUND

The statements in this section merely provide background information related to the present disclosure and may not constitute prior art. Such an electrical control system allows electrically controlling any actuation device mounted in an aircraft.

In an application to a nacelle, actuation devices allow the radial opening of cowlings for the maintenance of the turbojet engine, the deployment and retraction of movable cowls of the thrust reverser, or else the radial opening of the two half portions of the thrust reverser.

In an application to an aircraft, such control systems allow the primary and secondary flight controls or else the braking, steering, extension and retraction functions of landing gear, or even electric pumps.

Due to the reduced space available in the nacelle, the placement and protection of these electrical control systems remains a challenge for manufacturers. Moreover, an issue consisting in limiting the costs of electrical systems requires finding a compromise between a gain in availability obtained by making these systems redundant and the increase in costs linked to such a redundancy.

Each electrical control system used to drive an actuation device ensuring one of the aforementioned associated functions of the nacelle successively comprises a control module, a power module and an electric machine together forming a power control chain controlling an electric machine of the associated actuation device.

The document EP 2 419 620 A1 describes an improved electrical control system whose assembly forming the power control chain is doubled in order to increase its reliability. For this, the electrical control system of an actuation device comprises two control modules each electrically connected to two power modules and each power module of which is electrically connected to an electric machine to together form a power control chain driving the actuation device. Such a power control chain substantially improves its availability in the case of failure of one of these components and allows driving the actuation device by one of the control and power modules when the other control or power module fails.

Although such an electrical control system allows a greater availability of the system, it remains expensive and bulky when integrated into a nacelle. Moreover, this electrical control system has the drawback of doubling each of the control and power modules, this although a power module formed of electronic power components has a degree of reliability which is substantially higher than a control module formed of electronic control components.

The availability criterion refers to the ability of the actuation device controlled by the electrical control system to be actuated without failure in order to fulfill the function which associated thereto.

The reliability is the measurement of the probability of operation or failure of a system used under determined conditions and for a given time.

SUMMARY

This section provides a general summary of the disclosure and is not a comprehensive disclosure of its full scope or all of its features.

The present disclosure aims at overcoming at least one of the aforementioned drawbacks by proposing an improved electrical control system provided to equip a nacelle with a turbojet engine which has a gain in availability while facilitating the integration thereof into a nacelle and limiting the cost thereof.

To this end, the present disclosure relates to an electrical control system intended to equip an aircraft, particularly a nacelle of an aircraft, said electrical control system being characterized in that it comprises two control modules of a single power module driving an electric machine, and in that it comprises an approval module connecting each of the control modules to the power module, the approval module selectively authorizing the control of the power module by one of the control modules.

The use of two control modules for a single power module of an electric machine ensures a high degree of availability of the electrical control system while significantly reducing the cost and space requirement thereof in a nacelle relative to a fully redundant electrical control system.

According to one feature of the present disclosure, the approval module is configured to identify an inactive state of the authorized control module and when this inactive state is identified to allow the selection of the other control module for controlling the power module.

According to another feature of the present disclosure, the approval module is formed by discrete electronic components.

The use of discrete electronic components allows guaranteeing a high degree of reliability of the approval module and avoiding the need for often expensive software in development. Moreover, the discrete electronic components do not require the use of an external power supply.

According to another feature of the present disclosure, the control system is redundant to allow a simple failure tolerance of one of the electronic components constituting it.

The term "electronic component" means herein an electronic component which can be digital such as the control module, or else a discrete electronic component.

According to another feature of the present disclosure, for each control module, the approval module comprises a sub-module for monitoring the state of the corresponding control module.

According to another feature of the present disclosure, each monitoring sub-module is associated with a sub-module for validating the control of the power module by the control module corresponding to the monitoring sub-module.

According to another feature of the present disclosure, each monitoring sub-module and validation sub-module is associated with a logic function sub-module, the logic function sub-modules being connected in order to selectively authorize the control of the power module by one of the first or second control modules such that, when one of the control modules ensures the control of the power module, it checked that the other control module is deactivated.

According to another feature of the present disclosure, each control module comprises a servo-control unit of the electric machine and a control unit of the servo-control unit, the control unit being connected to a full authority electronic regulation unit by a digital link According to another feature of the present disclosure, the control modules each generate simultaneously and in parallel pulse width control signals to the approval module, the approval module being configured to authorize the passage of the pulse width control signals generated by the control module that it authorizes for the control of the power module.

Thus, in the case of a failure, no reconfiguration time of the electrical control system is introduced. Moreover, the control system does not require a dedicated software. It will be understood that the reconfiguration is passive. The reconfiguration time of the electrical control system corresponds to the time required, in the case of a failure, for the control system to selectively authorize the control of the power module by the other non-defaulting control module.

The present disclosure also relates to a system for actuating, for example a cylinder, integrated into an aircraft, the actuation system comprising the electrical control system as defined in the present document.

The present disclosure also relates to a turbojet engine nacelle of an aircraft including an electrical control system as defined in the present document.

The present disclosure moreover relates to an aircraft comprising an electrical control system as defined in the present document or an actuation system as defined in the present document or else a turbojet engine nacelle as defined in the present document.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
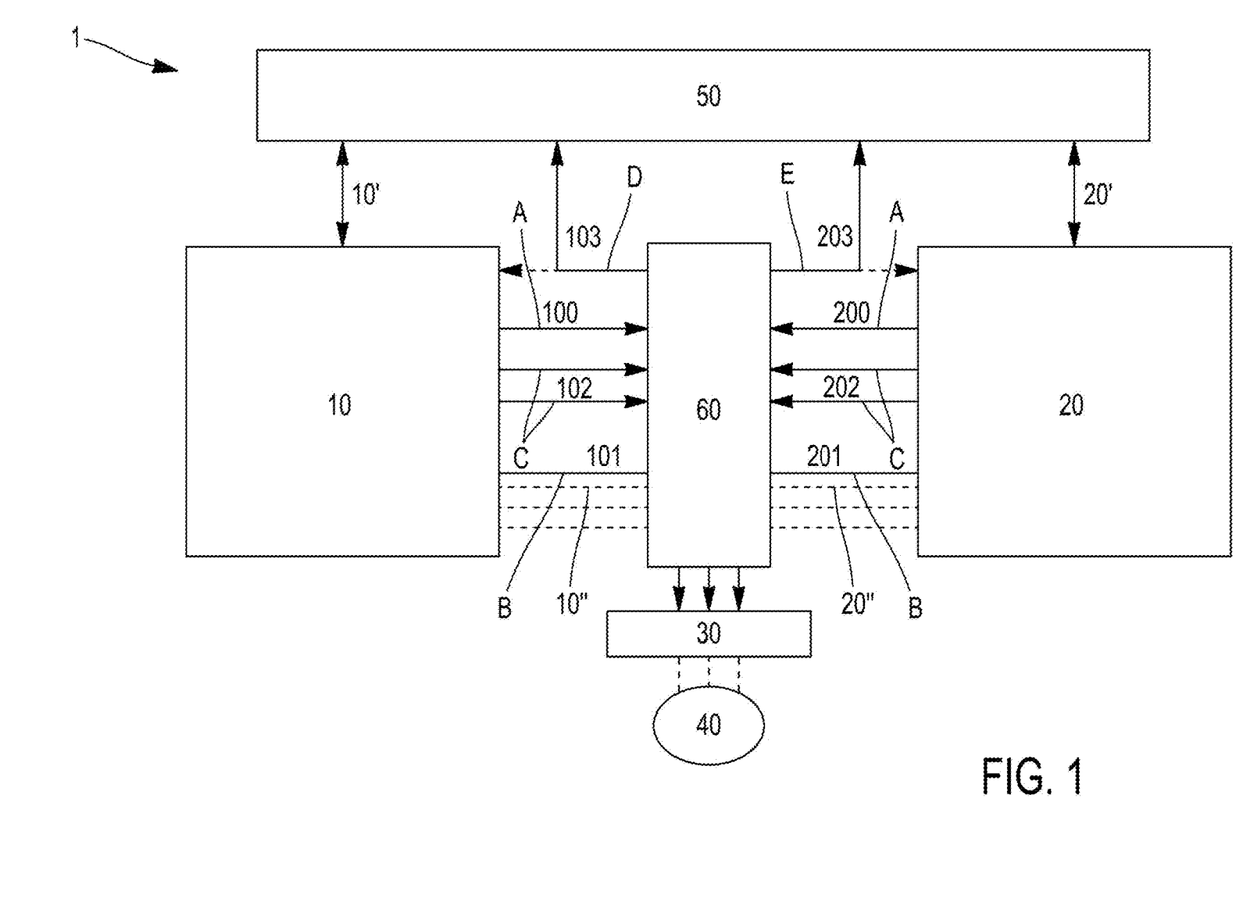
FIG. 1 is a schematic view of an electrical control system according to a first form of the present disclosure which comprises among others two modules for controlling a power module driving an electric machine, the power module being connected to the control modules via an approval module.

In FIG. 1, an electrical control system 1, which is intended to equip a turbojet engine nacelle of an aircraft, is represented. The electrical control system 1 comprises two control modules 10, 20, namely a first control module 10 and a second control module 20, of a single power module 30 driving an electric machine 40 which can advantageously be of any type, for example of the solenoid type or else of the electromagnet type.

The first and second control modules 10, 20 are advantageously digital circuits of the processor type. The power module 30 is of the inverter type.

These first and second control modules 10, 20 are advantageously connected, by a digital two-way communication link 10', 20' to a full authority electronic regulation unit 50 commonly referred to as EEC (Electronic Engine Control). The digital link 10', 20' is advantageously of the ARINC or AFDX type.

The full authority electronic regulation unit 50 ensures, among others, the function of sending orders of activation or deactivation of the first and second control modules 10, 20. More particularly, the full authority electronic regulation unit 50 is configured, at each instant, to generate an order of activation of one of the control modules 10, 20 and generate an order of deactivation of the other control module 10, 20 such that it is ensured that the power module 30 is controlled by a single control module 10, 20.

These activation or deactivation orders sent by the full authority electronic regulation unit 50 to the first and second control modules 10, 20 are, for example, a bit in a label of the communication protocol between the first or second control modules 10, 20 and the full authority electronic regulation unit 50. In other words, the full authority electronic regulation unit 50 sends the same activation or deactivation orders at a given time to each of the control modules 10, 20. The two control modules 10, 20 therefore receive the same setpoints from the full authority electronic regulation unit 50.

Each of the first and second control modules 10, 20 is configured to allow a servo control of the electric machine 40. Each first and second control module 10, 20 receives, by the full authority electronic regulation unit 50, the control instructions for servo-controlling the electric machine 40.

Such a servo control allows monitoring the speed, position and torque of the electric machine 40.

Moreover, the electrical control system 1 according to the present disclosure comprises an approval module 60 electrically connecting each of the first and second control modules 10, 20 to the power module 30. This approval module 60 allows selectively authorizing the control of the power module 30 by one of the first or second control modules 10, 20 such that when one of the control modules 10, 20 ensures the control of the power module 30, the other control module is deactivated.

The control of the power module 30 by the first or second control module 10, 20 allows, of course, driving the electric machine 40 to which the power module 30 is connected.

It will be understood that each of the first and second control modules 10, 20 is indirectly connected to the power module 30 via the approval module 60.

It will be understood, moreover, that the approval module 60 is distinct from the full authority electronic regulation unit 50.

The use of two control modules 10, 20 for a single power module 30 of an electric machine 40 ensures a high degree of availability of the electrical control system 1 while significantly reducing the cost and space requirement thereof in a nacelle relative to a fully redundant electrical control system.

The approval module 60 is configured to identify an inactive state of the control module 10, 20 authorized by the full authority electronic regulation unit 50 and when this inactive state is identified to disconnect the other control module 10, 20 for controlling the power module 30.

The inactive state of the control module 10, 20 authorized by the full authority electronic regulation unit 50 is representative of a failing state of this control module 10, 20 such that the latter cannot ensure the servo control of the electric machine 40.

Each first and second control module 10, 20 is electrically connected to the approval module 60 by a pulse width control signals 10", 20" of the power module 30 by which the driving of the electric machine 40 is ensured by pulse width control signals.

The control modules 10, 20 each generate simultaneously and in parallel pulse width control signals 10", 20" to the approval module 60, the approval module 60 being configured to authorize the passage of the pulse width control signals 10", 20" generated by the control module 10, 20 that it authorizes for the control of the power module 60. As represented, each first and second control module 10, 20 is electrically connected to the approval module 60 by a first channel A by which a first signal 100, 200 is generated, which is representative of the activation or deactivation state of the corresponding control module 10, 20. This first signal 100, 200 is generated depending on the orders of activation or deactivation of the first and second control modules 10, 20 received by the latter from the full authority electronic regulation unit 50.

When a control module 10, 20 receives, from the full authority electronic regulation unit 50, an activation order, this control module 10, 20 generates a signal 100, 200 representative of the activation state thereof which is received by the approval module 60. When a control module 10, 20 receives, from the full authority electronic regulation unit 50, a deactivation order, this control module 10, 20 generates a signal 100, 200 representative of the deactivated state thereof which is also received by the approval module 60.

This first signal 100, 200 received by the approval module 60 allows the latter to identify a first condition for approving the control of the power module 30 by the first or second control module 10, 20, this first condition being validated when a control module 10, 20 generates a signal 100, 200 representative of the activation state thereof which is received by the approval module 60.

Moreover, each first and second control module 10, 20 is electrically connected to the approval module 60 by a second channel B through which a second signal 101, 201 is generated, which is representative of the regulation of the control of the power module 30 by the corresponding control module 10, 20.

This second signal 101, 201 is advantageously a clock signal allowing the regulation of the control of the power module 30 by the corresponding control module 10, 20. In this case, it will be understood that the regulation of the control of the power module 30 is identified by the approval module 60 when this clock signal is received by the approval module 60, while a failure of the regulation of the control of the power module 30 by the corresponding control module 10, 20 is identified when this clock signal is not received by the approval module 60 within a predetermined period.

This second signal 101, 201 received by the approval module 60 allows the latter to identify a second condition for approving the control of the power module 30 by the first or second control module 10, 20, this second approval condition being validated when the clock signal is received by the approval module 60.

In addition, each first or second control module 20 is electrically connected to the approval module 60 by a third channel C through which a third signal 102, 202 is generated, which is representative of the active or inactive state of the corresponding control module 10, 20.

Of course, when a control module 10, 20 is active, the latter generates a third signal 102, 202 representative of the active state of the corresponding control module 10, 20. When a control module 10, 20 is inactive, the latter generates a third signal 102, 202 representative of the inactive state of the corresponding control module 10, 20.

It will also be understood that the first signal 100, 200 is generated depending on the orders of activation or deactivation of the first and second control modules 10, 20 received by the latter from the full authority electronic regulation unit 50. In other words, the first signal 100, 200 designates the control module 10, 20, which is selected to drive the power module 30, and the control module 10, 20, which is not selected to control the power module 30.

Furthermore, the third signal 102, 202 is representative of the active or inactive state of the corresponding control module 10, 20. In nominal operation, that is to say in a failure-free case, the first and second control modules 10, 20 are both active, the third signal 102, 202 from each of the control modules 10, 20 is representative of the active state of the control modules 10, 20. It will be understood that this third signal 102, 202 is thus representative of the operating state of the corresponding control module 10, 20 which thus allows identifying a malfunction.

Advantageously, each first and second control module 10, 20 is electrically connected to the approval module 60 by at least two third channels C through which, are generated on each of them, a third signal 102, 202 representative of the active or inactive state of the corresponding control module 10, 20. The redundancy of the third signal 102, 202 generated on each of the two third channels of the first and second control modules 10, 20 allows tolerance to the loss of information of this third signal 102, 202.

At least one third signal 102, 202 generated by one of the control modules 10, 20 is combined by the approval module 60 with at least one third signal 102, 202 generated by the other control module 10, 20 in order to selectively authorize the control of the power module 30 by one of the first or second control modules 10, 20 such that, when one of the first or second control modules 10, 20 ensures the control of the power module 30, it is checked that the other control module 10, 20 is deactivated.

The combination of these third signals 102, 202 received by the approval module 60 allows the latter to identify a third condition for approving the control of the power module 30 by the first or second control module 10, 20 authorized by the full authority electronic regulation unit 50, this third approval condition being validated when the third signal 102, 202 generated by the control module authorized by the full authority electronic regulation unit 50 is representative of an active state of this control module 10, 20 and when the third signal 102, 202 generated by the other control module control is representative of an inactive state of this control module 10, 20.

The approval module 60 is electrically connected to the full authority electronic regulation unit 50 by a fourth channel D and a fifth channel E. Alternatively, the approval module 60 is electrically connected by the fourth channel D to the first control module 10 and the approval module 60 is connected by the fifth channel E to the second control module 20.

From the fourth channel D, the approval module 60 generates a fourth signal 103 representative of the combination of the second and third approval conditions relating to the first control module 10. From the fifth channel E, the approval module 60 generates a fifth signal 203 representative of the combination of the second and third approval conditions relating to the second control module 20.

The operation of the electrical control system 1 is described below.

When the control module 10, 20 authorized by the full authority electronic regulation unit 50 is the first control module 10, the full authority electronic regulation unit 50 sends an order of activation of the first control module 10 and sends an order of deactivation of the second control module 20.

When the first, second and third approval conditions relating to the first control module 10 are validated, the control of the power module 30 by the first control module 10 is authorized by the approval module 60. The approval module 60 then authorizes the first control module 10 to control the power module 30 via the pulse width control bus 10" of the power module 30 of the first control module 10. Moreover, the first, second and third approval conditions relating to the second control module 20 are not validated, the control of the power module 30 by the second control module 20 is not authorized by the approval module 60.

When one of the second or third approval conditions relating to the first control module 10 is not validated, the fourth signal 103 generated by the approval module 60 is representative of a failing state of the first control module 10. The regulation unit receiving this fourth signal 103 sends an order of deactivation of the first control module 10 and an order of activation of the second control module 20.

The control module 10, 20 authorized by the full authority electronic regulation unit 50 is then the second control module 20.

When the first, second and third approval conditions relating to the second control module 20 are validated, the control of the power module 30 by the second control module 20 is authorized by the approval module 60. The approval module 60 then authorizes the second control module 20 to control the power module 30 via the pulse width control bus of the second control module 20.

Figure 2:
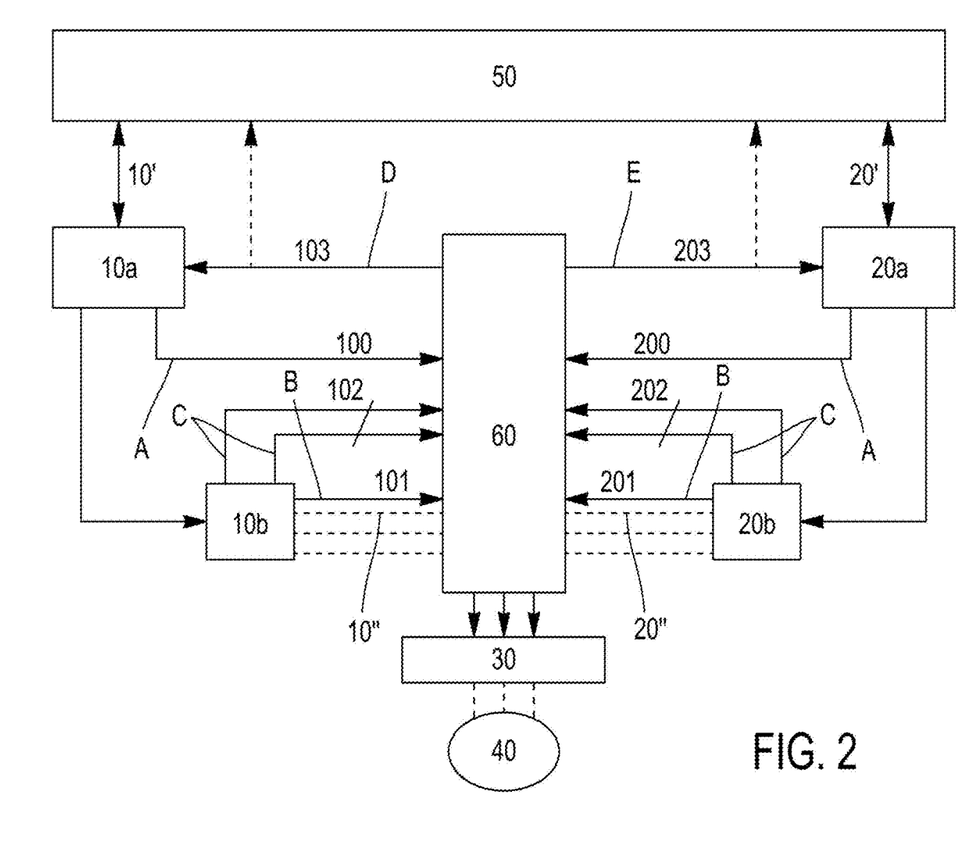
FIG. 2 is a schematic view of an electrical control system according to a second form of the present disclosure.

In FIG. 2, a second form of the present disclosure is represented, where each first and second control module 10, 20 comprises a servo-control unit 10b, 20b of the electric machine 40 and a control unit 10a, 20a of the servo-control unit 10b, 20b connected to each other, the control unit 10a, 20a being connected to a full authority electronic regulation unit 50 by the digital link 10', 20' as previously defined.

According to this variation, for each control module 10, 20, the first channel A electrically connects the control unit 10a, 20a corresponding to the approval module 60, while the second and third channels B, C electrically connect the servo-control unit 10b, 20b corresponding to the approval module 60.

, According to this second form, for each first and second control module 10, 20, from the first channel A a first signal 100, 200 is generated, which is representative of the state of activation or deactivation of the control unit 10a, 20a of the corresponding control module 10, 20. This first signal 100, 200 is generated depending on the orders of activation or deactivation of the first and second control modules 10, 20 received by these control units from the full authority electronic regulation unit 50.

For each first and second control module 10, 20, from the second channel B, a second signal 101, 201 is generated, which is representative of the regulation of the control of the power module 30 by the servo-control unit 10b, 20b of the corresponding control module 10, 20.

For each first and second control module 10, 20 a third signal 102, 202 which is redundant and representative of the active or inactive state of the servo-control unit 10b, 20b of the corresponding control module 10, 20. The redundancy of the third signal 102, 202 generated on each of the two third channels 102, 202 of the control unit 10a, 20a of the first and second control modules 10, 20 allows the tolerance to the loss of information of this third signal 102, 202.

Moreover, for each control module 10, 20, the corresponding servo-control unit 10b, 20b is electrically connected to the approval module 60 by a pulse width control bus of the power module 30.

When the control unit 10a, 20a authorized by the full authority electronic regulation unit 50 is the control unit 10a of the first control module 10, the full authority electronic regulation unit 50 sends an order of activation to the unit 10a for controlling the first control module 10 and sends an order of deactivation of the unit 20a for controlling the second control module 20.

When the first, second and third approval conditions relating to the first control module 10 are validated, the control of the power module 30 by the first control module 10 is authorized by the approval module 60. The approval module 60 then authorizes the servo-control unit 10b, 20b of the first control module 10 to control the power module 30 via the pulse width control bus 10" of the servo-control unit 10b of the first control module 10.

When one of the second or third approval conditions relating to the first control module 10 is not validated, the fourth signal 103 generated by the approval module 60 is representative of a failing state of the servo-control unit 10b of the first control module 10 or of any other electronic component of the approval module 60. The control unit 10a, 20a receiving this fourth signal 103 sends the control unit 50 information of this failing state. The full authority electronic regulation unit 50 then sends an order of deactivation of the servo-control unit 10b of the first control module 10 and an order of activation of the control unit 20a of the second control module 20.

When the first, second and third approval conditions relating to the second control module 20 are validated, the control of the power module 30 by the servo-control unit 20b of the second control module 20 is authorized by the approval module 60. The approval module 60 then authorizes the servo-control unit 20b of the second control module 20 to control the power module 30 via the pulse width control bus 20' of the second control module 20.

Figure 3:
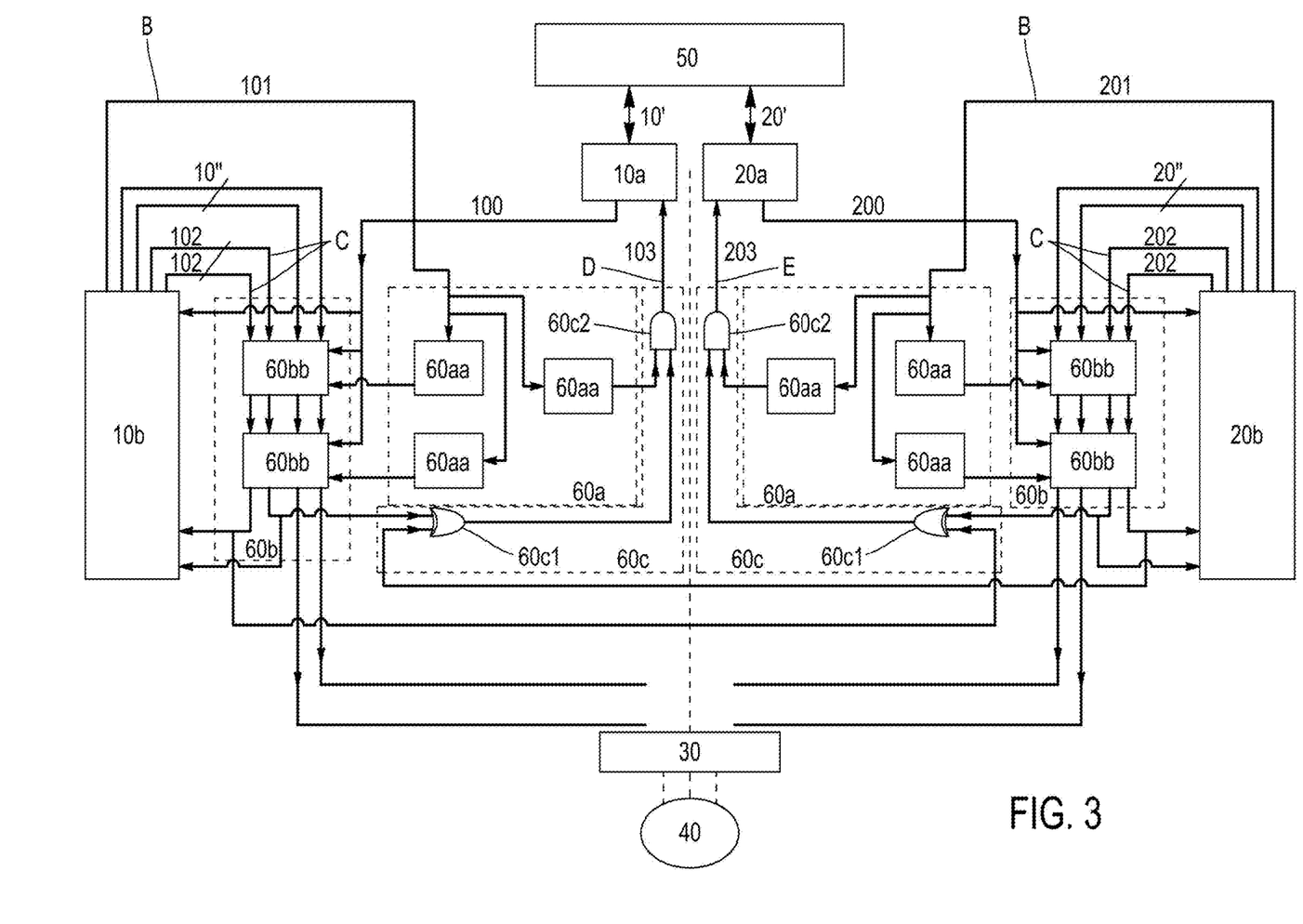
FIG. 3 is a schematic view of the approval module according to the second form of the present disclosure.

In FIG. 3, a schematic view of the approval module 60 is represented according to the second form.

The approval module 60 is formed by discrete electronic components. The use of discrete electronic components allows guaranteeing a high degree of reliability of the approval module 60 and avoiding the need for often expensive software in development.

For each control module 10, 20, the approval module 60 comprises a monitoring sub-module 60a of the state of the corresponding control module 10, 20. More particularly, each monitoring sub-module 60a allows monitoring the state of the servo-control unit 10b, 20b of the corresponding control module 10, 20.

Each monitoring sub-module 60a comprises monostable flip-flops 60aa and receives as input the second channel B of the corresponding control module 10, 20 by which the second signal 101, 201 is generated, which is representative of the regulation of the control of the power module 30 by the corresponding control module 10, 20. These monostable flip-flops 60aa allow generating as output a stable state resulting from the second signal 101, 201 generated by the corresponding control module 10, 20, more particularly, generated by the servo-control unit 10b, 20b of the corresponding control module 10, 20. These monostable flip-flops 60aa allows ensuring that the oscillating state of the input signal is not blocked. It will be understood that the monostable flip-flops 60aa are redundant to allow the tolerance to information loss.

Each monitoring sub-module 60a is associated with a sub-module 60b for validating the control of the power module 60 by the control module 10, 20 corresponding to the monitoring sub-module.

Each validation sub-module 60b is formed of the two discrete electronic switches 60bb connected in cascade to each other. Such redundancy of the discrete electronic switches 60bb is carried out in order to prevent a simple failure, for example when a discrete electronic switch 60bb is blocked, then preventing the deactivation of the active control module 10, 20 and the switching on the another control module 10, 20. Each of the discrete electronic switches 60bb successively receives as input the third signals 102, 202 and the pulse width control bus 10'', 20'' connected to the corresponding control module 10, 20. These discrete electronic switches 60bb receive as a validation input, on the one hand, the first signal 100, 200 representative of the state of activation or deactivation of the control unit 10a, 20a of the corresponding control module 10, 20, and on the other hand, for each of them the output state of a monostable flip-flop 60aa of the monitoring sub-module 60a.

When the first condition and the second condition are validated, the discrete electronic switches 60bb authorize as output the passage of these third signals 102, 202 and pulse width control signals 10'', 20'' of the servo-control unit 10b, 20b of the corresponding control module 10, 20.

When one of the first or second condition is not validated, the discrete electronic switches 60bb do not authorize as output the passage of these third signals 102, 202 and pulse width control signals 10'', 20'' of the servo-control unit 10b, 20b of the corresponding control module 10, 20.

Moreover, each monitoring sub-module 60a and validation sub-module 60b is associated with a logic function sub-module 60c, the logic function sub-modules 60c being connected in order to selectively authorize the control of the power module 60 by one of the first or second control modules 10, 20 such that, when one of the control modules 10, 20 ensures the control of the power module 60, it checked that the other control module 10, 20 is deactivated.

For this, each logic function sub-module 60c comprises a first combinational logic electronic component 60c1 allowing a logic function of the XOR type. This first combinational logic electronic component 60c1 receives as input, on the one hand, a third signal 102, 202 generated by the servo-control unit 10b, 20b of the corresponding control module 10, 20 and, on the other hand, a third signal 102, 202 generated by the servo-control unit 10b, 20b of the other control module 10, 20.

For each control module 10, 20, the output signal of the first combinational logic electronic component 60c1 corresponds to the third signal 102, 202 as previously defined.

Moreover, each logic function sub-module 60c comprises a second combinational logic electronic component 60c2 allowing a logic function of the AND type. This second combinational logic electronic component 60c2 receives as input, on the one hand, the output state of a monostable flip-flop 60bb of the validation sub-module 60b and, on the other hand, the output state of the first combinational logic electronic component 60c1.

The output signal of the second combinational logic electronic component 60c2 of the first and second control modules 10, 20 corresponds respectively to the fourth and fifth signals 103, 203 as previously defined.

According to the present disclosure, the control system is redundant to allow a tolerance to the simple failure of one of the electronic components constituting it.

The redundancy is advantageously obtained by the redundancy of the third signal 102, 202, the redundancy of the monostable flip-flops 60aa, as well as by the redundancy of the discrete electronic switches 60bb and more generally by the redundancy of each of the control modules 10, 20 and of the sub-modules referenced 60a, 60b and 60c.

Figure 4:
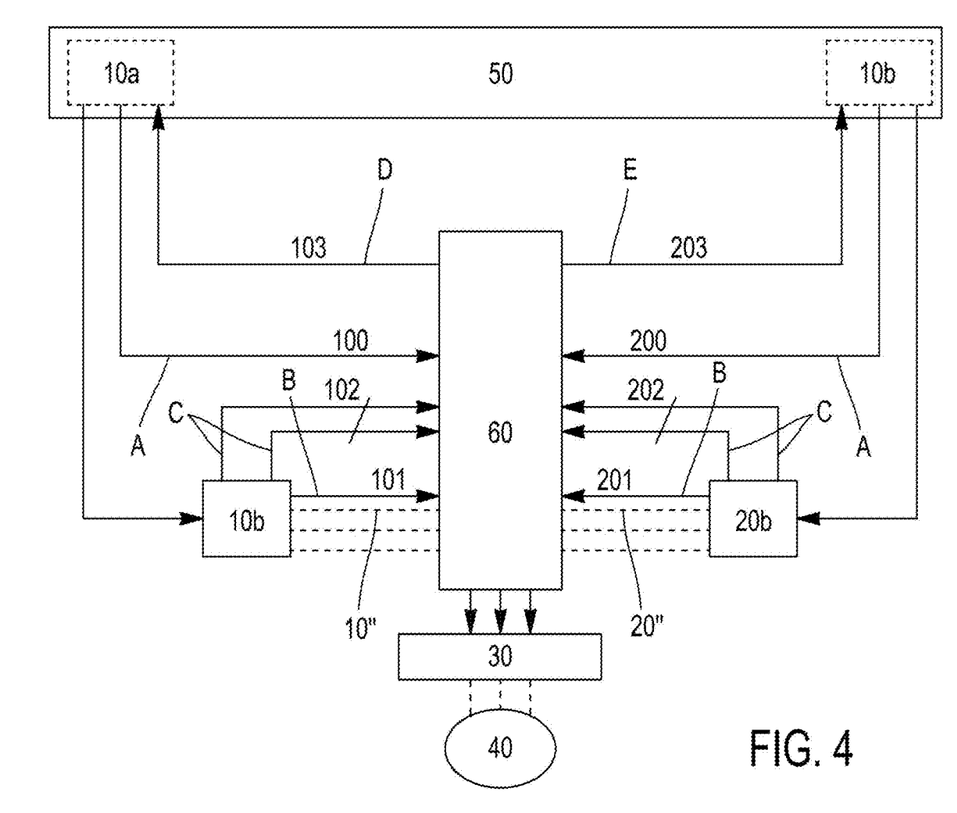
FIG. 4 is a schematic view of an electrical control system according to a third form of the present disclosure.

In FIG. 4, a third form of the present disclosure is represented, in which the full authority electronic regulation unit 50 comprises each of the control units 10a, 20a of the first and second control modules 10, 20. According to this variation, the digital link 10', 20' connecting the control units 10a, 20a to the full authority electronic regulation unit 50 is directly integrated into the architecture of the full authority electronic regulation unit 50. Each control unit 10a, 20a is connected to the corresponding servo-control unit 10b, 20b thereof.

Moreover, in the same manner, the first channel A, the fourth channel D and the fifth channel E electrically connect the corresponding control unit 10a, 20a, integrated to the full authority electronic regulation unit 50, to the approval module 60.

Obviously, the present disclosure is not limited to the examples which have just been described and numerous arrangements can be made to these examples without departing from the scope of the present disclosure. In particular, the different features, shapes, variants and forms of the present disclosure can be associated with each other according to various combinations as long as they are not incompatible or exclusive of each other. In particular, all previously described variants and forms can be combined with each other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electrical control system for an aircraft, said electrical control system comprising:
   two control modules of a single power module driving an electric machine; and
   an approval module formed by at least one electronic component connecting each of the two control modules to the single power module, the approval module selectively authorizing control of the single power module by one of the two control modules, for each of the two control modules, the approval module comprises a monitoring sub-module for monitoring a state of a corresponding one of the two control modules, and the two control modules are indirectly connected to the single power module via the approval module.

2. The electrical control system according to claim 1, wherein the approval module is configured to identify an inactive state of an authorized one of the two control modules and based on the identification of the inactive state, to allow selection of an other one of the two control modules for controlling the single power module.

3. The electrical control system according to claim 1, wherein the approval module is formed by a plurality of discrete electronic components.

4. The electrical control system according to claim 1, wherein the electrical control system is redundant to allow a simple failure tolerance of one of one or more electronic components of the electrical control system.

5. The electrical control system according to claim 1, wherein each monitoring sub-module is associated with a validation sub-module for validating control of the single power module by at least one of the two control modules corresponding to the respective monitoring sub-module.

6. The electrical control system according to claim 5, wherein each monitoring sub-module and validation sub-module is associated with a logic function sub-module, the logic function sub-module being connected in order to selectively authorize control of the single power module by one of the two control modules such that, when one of the two control modules has control of the single power module, the logic function sub-module checks that an unauthorized other control module of the two control modules is deactivated.

7. The electrical control system according to claim 1, wherein each of the two control modules comprises a servo-control unit of an electric motor and a control unit of the servo-control unit, the control unit being connected to a full authority electronic regulation unit by a digital link.

8. The electrical control system according to claim 1, wherein the two control modules each generate simultaneously and in parallel pulse width control signals to the approval module, the approval module being configured to authorize a passage of pulse width control signals generated by the two control modules that the approval module authorizes for control of the single power module.

9. An aircraft having an electrical control system comprising:
   two control modules of a single power module driving an electric machine of the aircraft; and
   an approval module formed by at least one electronic component connecting each of the two control modules to the single power module, the approval module selectively authorizing the control of the single power module by one of the two control modules, for each of the two control modules, the approval module comprises a monitoring sub-module for monitoring a state of a corresponding one of the two control modules, and the two control modules are indirectly connected to the single power module via the approval module.

* * * * *